United States Patent [19]

Matsugu et al.

[11] Patent Number: 5,706,419

[45] Date of Patent: Jan. 6, 1998

[54] IMAGE CAPTURING AND PROCESSING APPARATUS AND IMAGE CAPTURING AND PROCESSING METHOD

[75] Inventors: Masakazu Matsugu, Chiba; Katsumi Iijima, Hachioji; Kotaro Yano, Yokohama; Sunao Kurahashi, Kanagawa-ken; Toshiaki Kondo, Fujisawa; Motohiro Ishikawa, Yokohama, all of Japan

[73] Assignee: Canon Kabushiki Kaisha, Tokyo, Japan

[21] Appl. No.: 603,613

[22] Filed: Feb. 21, 1996

[30] Foreign Application Priority Data

Feb. 24, 1995 [JP] Japan ................................. 7-036710

[51] Int. Cl.⁶ ................................................. G06F 15/00
[52] U.S. Cl. ................................................. 395/135
[58] Field of Search ...................... 395/135, 129, 395/133, 134, 119, 120; 345/113, 114

[56] References Cited

U.S. PATENT DOCUMENTS 5,613,049  3/1997  Brechner et al. ................. 395/120

FOREIGN PATENT DOCUMENTS 564393   6/1986   Japan.
486957   3/1992   Japan.
4306782  10/1992  Japan.
512443   5/1993   Japan.

OTHER PUBLICATIONS

Kass, M., et al., "Snakes: Active Contour Models," *International Journal of Computer Vision*, pp. 321–331, 1988.

*Primary Examiner*—Phu K. Nguyen
*Attorney, Agent, or Firm*—Morgan & Finnegan, L.L.P.

[57] ABSTRACT

An image capturing and processing apparatus has image pickup means, first image memorizing means in which an object image from a predetermined viewing point position captured by the image pickup means is memorized, three-dimensional shape model memorizing means for producing a reference object image from a viewing point position nearest to the pick-up object image on the basis of a reference three-dimensional shape model, second image memorizing means in which the produced reference object image is memorized, different portion extracting means for extracting the difference between the object image and the reference object image memorized in the respective image memorizing means, and shape model correcting means for correcting the reference three-dimensional shape model on the basis of the extracted difference. By the reference three-dimensional shape model which is the typical shape model of an object being corrected on the basis of the different portion between the object image and the reference object image, the shape model of the object is recovered.

14 Claims, 7 Drawing Sheets

IMAGE CAPTURING AND PROCESSING APPARATUS AND IMAGE CAPTURING AND PROCESSING METHOD

BACKGROUND OF THE INVENTION

1. Field of the Invention

This invention relates to an image capturing and processing apparatus and an image capturing and processing method for recovering a three-dimensional shape model regarding an object on the basis of the image of the object.

2. Related Background Art

As the technique of recovering a three-dimensional shape model regarding an object on the basis of the image of the object obtained by image pickup, there are the following systems and method disclosed, for example, in Japanese Laid-Open Patent Application No. 4-306782, Japanese Patent Publication No. 5-64393 and Japanese Laid-Open Patent Application No. 4-86957, respectively.

(1) The System Disclosed in Japanese Laid-Open Patent Application No. 4-306782

By the use of the slit light projection method (or the light-section method) of applying slit light to an object and picking it up by a camera, extracting characteristic points from the image of the object obtained by this image pickup, and calculating the three-dimensional structural information of the object on the basis of the extracted characteristic points, three-dimensional coordinates data at each characteristic point of the image of the object are calculated. On the basis of the three-dimensional coordinates data at each characteristic point obtained thereby, a basic three-dimensional wire frame registered in a data base is adjusted to the image of the object to thereby effect the recovery of a three-dimensional shape model.

(2) The Method Disclosed in Japanese Patent Publication No. 5-64393

On the basis of a two-dimensional photographed image obtained by photographing an object from a plurality of visual axis directions, an object existing area reflecting the shape of the object as it is seen from each visual axis direction is described as an aggregate of three-dimensional picture elements in a three-dimensional digital image space, and an aggregate of three-dimensional picture elements that exist in common in the three-dimensional space as it is seen from all directions is found as the three-dimensional shape of the object in the three-dimensional digital image to thereby effect the recovery of a three-dimensional shape model.

(3) The System Disclosed in Japanese Laid-Open Patent Application No. 4-86957

This is a system in which a near infrared reflection tape or a marker or the like of a hue differing from the background is imparted to a characteristic point of an object and the object image is captured from a plurality of directions by an image pickup device and from the obtained image, the three-dimensional coordinates of the characteristic points or lines are extracted based on a standard three-dimensional model. Concretely, the three-dimensional coordinates are collated with and interpolated with the result of measured each grid point of a three-dimensional grid model which is the reference from each direction to thereby effect the calibration of the position of the characteristic point, and the conversion look-up table of a fixed camera coordinates system and a reference coordinates system is prepared, whereafter the object with markers or the like is captured from a plurality of directions and three-dimensional coordinates of the characteristic point are obtained to thereby effect the recovery of the three-dimensional shape of the object.

However, the systems and method disclosed in the above-mentioned publications suffer from the following problems, respectively.

In the systems disclosed in Japanese Laid-Open Patent Application No. 4-306782 and Japanese Laid-Open Patent Application No. 4-86957, a special device such as slit light projecting means or means for imparting a marker is necessary as the means for directly measuring the three-dimensional shape of the object. This poses a problem in achieving the downsizing and low cost of the apparatus. Further, outside the area where the slit light is projected or the marker is imparted, the three-dimensional coordinates need be found by a process such as interpolation, and this leads to the problem that has the process complicated.

In the method disclosed in Japanese Patent Publication No. 5-64393, it is necessary to take the visual axis direction equally in every azimuth, and this leads to the problem that much time is required for processing. There arises a further problem that the recovery of a shape model accurately reflecting local three-dimensional structure is difficult.

SUMMARY OF THE INVENTION

It is an object of the present invention to provide an image capturing and processing apparatus which can simply reconstruct a three-dimensional shape model from an object image without requiring any special device such as slit light projecting means or means for imparting a marker and any complicated process such as an interpolating process. It is a further object of the present invention to provide an image capturing and processing apparatus which can accurately reflect local three-dimensional structure for the recovery of a three-dimensional shape model.

The image capturing and processing apparatus of the present invention is characterized by image pickup means, first image memorizing means in which an object image from a predetermined viewing point position captured by the image pickup means is memorized, three-dimensional shape model memorizing means for memorizing a reference three-dimensional shape model regarding the object image captured by the image pickup means, and producing a reference object image from a viewing point position nearest to the object image captured by the image pickup means, on the basis of the reference three-dimensional shape model, second image memorizing means in which the reference object image produced by the three-dimensional shape model memorizing means is memorized, difference extracting means for extracting the difference between the object image memorized in the first image memorizing means and the reference object image memorized in the second image memorizing means, and shape model correcting means for correcting the reference three-dimensional shape model memorized in the three-dimensional shape model memorizing means, on the basis of the difference extracted by the difference extracting means.

In this case, a plurality of object images from different viewing point positions may be memorized in the first image memorizing means, a plurality of reference object images corresponding to the plurality of object images from the different viewing point positions may be memorized in the second image memorizing means, the difference extracting means may extract the difference between the mutually corresponding ones of the object images memorized in the first image memorizing means and the reference object images memorized in the second image memorizing means, and the shape model correcting means may correct the reference three-dimensional shape model memorized in the three-dimensional shape model memorizing means, on the basis of the respective difference extracted by the different portion extracting means.

Further, the correction of the reference three-dimensional shape model effected in the shape model correcting means may be effected by the use of an affine transformation coefficient, and the shape model correcting means may effect the correction of the reference three-dimensional shape model by the use of such an affine transformation coefficient that the different portion extracted by the difference extracting means becomes minimum.

In the above-described image capturing and processing apparatus, design may be made such that the reference three-dimensional shape model memorized in the three-dimensional shape model memorizing means is a mesh-like wire frame model divided into predetermined shapes, and that the different portion extracting means extracts the different portion between the object image and the reference object image on the basis of the representative coordinates of the respective elements of the wire frame model divided into mesh-like shapes and the normal vector at the corresponding coordinate point.

Further, design may be made such that after the correction of the reference three-dimensional shape model by the shape model correcting means is effected, the three-dimensional shape model memorizing means produces the reference object image on the basis of the corrected reference three-dimensional shape model, and that the shape model correcting means repetitively effects the correction of the reference three-dimensional shape model until the different portion between the reference object image based on the reference three-dimensional shape model after the correction and the object image extracted by the different portion extracting means becomes a predetermined threshold value or less.

In this case, the different portion extracting means may be one which extracts the difference regarding structural information for correcting the reference three-dimensional shape model and the difference regarding texture information for correcting the reference object image produced by the three-dimensional shape model memorizing means, and which has texture correcting means for correcting the reference object image after the correction of the reference three-dimensional shape model produced by the three-dimensional shape model memorizing means, on the basis of the difference regarding the texture information extracted by the different portion extracting means.

Also, the image capturing and processing apparatus of the present invention is characterized by image pickup means, image memorizing means in which an object image from a predetermined viewing point position captured by the image pickup means, three-dimensional shape model memorizing means in which a reference three-dimensional shape model regarding the object captured by the image pickup means is memorized, contour image extracting means for extracting a boundary contour image regarding a reference object image from a viewing point position nearest to the object image captured by the image pickup means, on the basis of the reference three-dimensional shape model memorized in the three-dimensional shape model memorizing means, initial contour setting means for setting an initial contour so that the position and size of the contour image regarding the reference object image extracted by the contour image extracting means may subsume the image area of the object image memorized in the image memorizing means, active contour processing means for producing a contour image regarding the object image memorized in the image memorizing means, on the basis of the contour of the contour image of which the initial contour has been set by the initial contour setting means, difference extracting means for extracting the difference between the contour image regarding the object image produced by the active contour processing means and the contour image regarding the reference object image of which the initial contour has been set by the initial contour setting means; and shape model correcting means for correcting the reference three-dimensional shape model memorized in the three-dimensional shape model memorizing means, on the basis of the difference extracted by the difference extracting means.

In this case, the contour image extracting means may be one which extracts the contour image regarding such a reference object image that the difference extracted by the difference extracting means becomes minimum.

Also, the image capturing and processing method of the present invention is an image capturing and processing method of recovering a three-dimensional shape model regarding an object on the basis of an object image captured by image pickup means, characterized by the first step of memorizing a reference three-dimensional shape model regarding the object image-captured, the second step of producing a reference object image corresponding to the object image captured by the image pickup means, on the basis of the reference three-dimensional shape model memorized at the first step, the third step of extracting the difference between the reference object image produced at the second step and the object image captured by the image pickup means; and the fourth step of correcting the reference three-dimensional shape model regarding the object memorized at the first step, on the basis of the difference extracted at the third step, and recovering the shape model of the object.

In this case, design may be made such that at the third step, the differences between mutually corresponding ones of a plurality of object images from different viewing point positions captured by the image pickup means and a plurality of reference object images from different viewing point positions corresponding to the plurality of object images are extracted, and that at the fourth step, the reference three-dimensional shape model regarding the object is corrected on the basis of the differences extracted at the third step.

Also, the image capturing and processing method of the present invention is an image capturing and processing method of recovering a reference three-dimensional shape model regarding an object on the basis of an object image contured by image pickup means, characterized by, the first step of memorizing a reference three-dimensional shape model regarding the object image captured, the second step of extracting the contour image of a reference object image corresponding to the object image captured by the image pickup means, on the basis of the reference three-dimensional shape model memorized at the first step; the third step of setting an initial contour so that the position and size of the contour image regarding the reference object image extracted at the second step may subsume the image area of the object image captured by the image pickup means;

the fourth step of producing a contour image regarding the object image captured by the image pickup means, on the basis of the contour image regarding the reference object image of which the initial contour has been set at the third step; the fifth step of extracting the difference between the contour image regarding the object image produced at the fourth step and the contour image regarding the reference object image of which the initial contour has been set at the third step; and the sixth step of correcting the reference three-dimensional shape model regarding the object memorized at the first step, on the basis of the difference extracted at the fifth step, and recovering the shape model object.

In the image processing apparatus and processing method of the present invention, the typical shape model of an object, for example, if the object is a particular man's head, the standard shape model of the man's head, is memorized as a reference three-dimensional shape model. On the basis of the memorized reference three-dimensional shape model, a reference object image corresponding to the object image captured by the image pickup means, i.e., a reference object image of which the viewing point position (visual axis direction) and the image size are the same as those of the object image is produced. The difference between the thus produced reference object image and the object image reflects the difference in similarity of shape between the three-dimensional shapes of the object and the reference three-dimensional shape model and the difference between the two-dimensional shapes or dispositions of various portions (such as the eyes and the mouth). Accordingly, if the reference three-dimensional shape model of the object is corrected on the basis of the difference between the reference object image and the object image, the difference between the three-dimensional shapes of the object and the reference three-dimensional shape model and the difference between the two-dimensional shapes or the dispositions of the various portions are reflected in the corrected reference three-dimensional shape model. By thus effecting the correction of the reference three-dimensional shape model on the basis of the difference between the object image and the reference object image produced on the basis of the reference three-dimensional shape model, the recovery of the three-dimensional shape model regarding the object can be effected and therefore, any special device such as slit light projecting means or means for imparting a marker and any complicated process such as an interpolating process are unnecessary.

In the apparatus and method of the present invention wherein the recovery of a three-dimensional shape model is effected on the basis of the difference between a plurality of object images from different viewing points and a plurality of reference object images corresponding thereto, the correction of the reference three-dimensional shape model is effected on the basis of the difference between a plurality of object images from different viewing point positions and a plurality a reference object images corresponding thereto and therefore, local three-dimensional structure can be corrected from different viewing point positions, and the correction of the reference three-dimensional shape model accurately reflecting the local structure can be effected.

In the apparatus of the present invention wherein a transformation coefficient for correcting the reference three-dimensional shape model found from the difference extracted by the difference extracting means is given by an affine transformation coefficient, the correction of the reference three-dimensional shape model by the shape model correcting means is effected by the use of a three-dimensional affine transformation coefficient of a point on the reference three-dimensional shape model corresponding to a point on the object image and therefore, as compared with an apparatus and method in which the correction is effected on the basis of the difference between the image data (for example, the luminance and hue data of each picture element) of the object image and the reference object image, the correction of the reference three-dimensional shape model can be more simplified.

In the apparatus of the present invention wherein the correction of the reference three-dimensional shape model by the shape model correcting means is repetitively effected, the correcting process for the reference three-dimensional shape model by the three-dimensional shape model correcting means is repetitively effected until the difference extracted by the difference extracting means becomes a predetermined threshold value or less and therefore, the correction of errors and the correction of shape data which cannot be completely covered by a single correcting process can be accomplished.

In the apparatus of the present invention wherein the reference object image after the correction of the reference three-dimensional shape model is effected by the shape model correcting means, the texture of reference object image after the correction of the reference three-dimensional shape model is corrected by the texture correcting means and therefore, more highly accurate three-dimensional shape data of the object can be obtained.

In the apparatus and method of the present invention, wherein the correction of the reference three-dimensional shape model is effected on the basis of the difference between the contour image regarding the object image and the contour image regarding the reference object image, the contour image of the reference object image corresponding to the object image is extracted on the basis of the reference three-dimensional shape model and the setting of the initial contour is effected so that the position and size of the contour image regarding the extracted reference object image may subsume the image area of the object image memorized in the image memorizing means. By this setting of the initial contour, the viewing point position and image size of the contour image regarding the reference object image become substantially the same as those of the object image memorized in the image memorizing means. Thus, in the present invention, the contour image regarding the reference object image of which the initial contour has been set becomes substantially the same as the object image in the viewing point position and the image size and therefore, by using a active contour method which will be described later with respect to some embodiments of the invention, the contour images regarding the object can be found rapidly and simply. Since as described above, the difference between these contour images also reflects the difference between the three-dimensional shapes of the object and the reference three-dimensional shape model and the difference shape model and the difference between the two-dimensional shapes or dispositions of the various portions, the reference three-dimensional shape model is corrected on the basis of that difference, whereby the recovery of the three-dimensional shape model regarding the object can be accomplished.

In the apparatus of the present invention wherein the contour image regarding the reference object image of which the difference extracted by the difference extracting means becomes minimum is extracted, the contour image regarding the reference object image set by the initial contour setting means and the contour image regarding the object image produced by the active contour processing means are image data highest in the degree of similarity and therefore, more accurate correction of the reference three-dimensional shape model can be accomplished.

DESCRIPTION OF THE PREFERRED EMBODIMENTS

Some embodiments of the present invention will hereinafter be described with reference to the drawings.
<First Embodiment>

Figure 1:
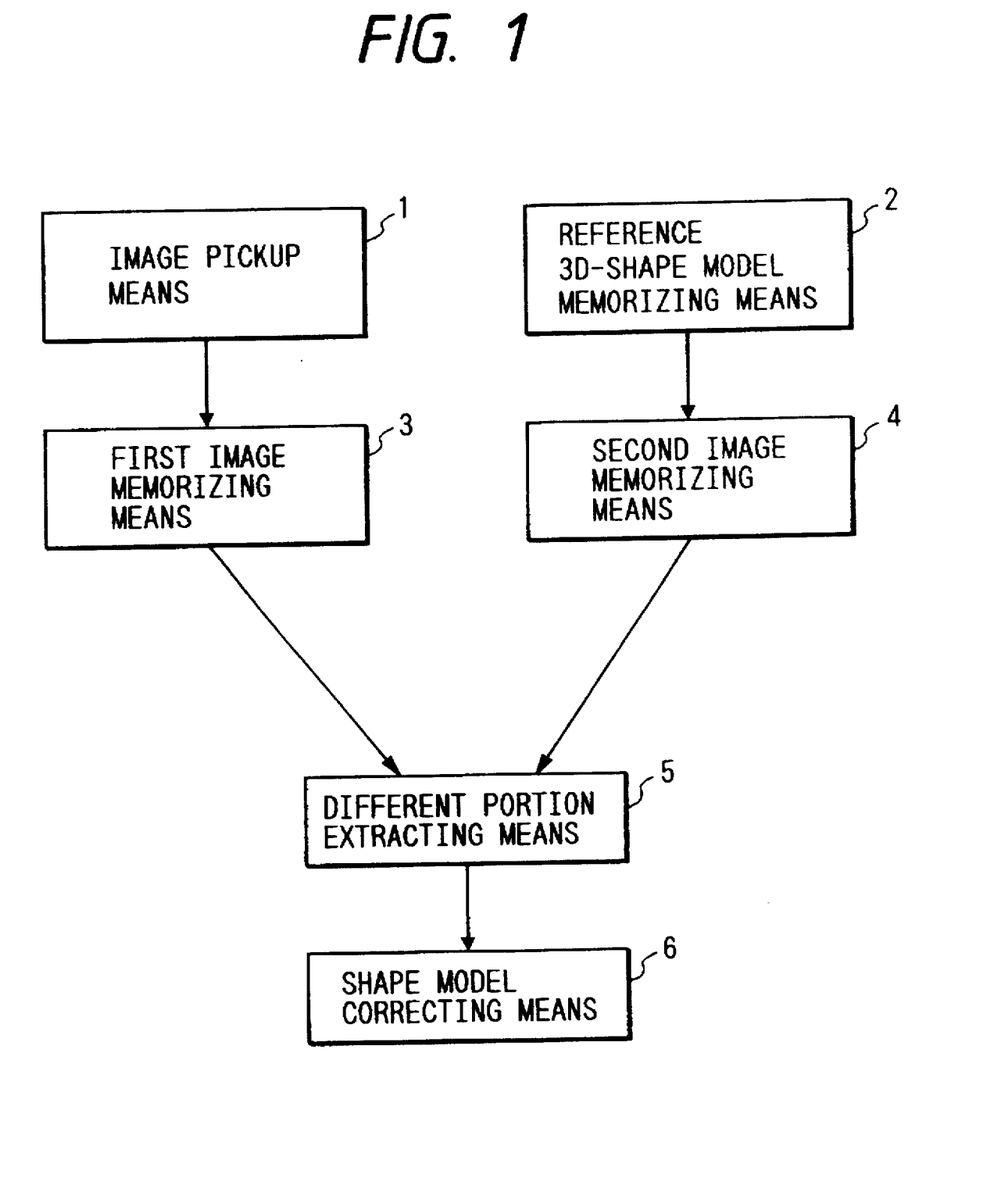
FIG. 1 diagrammatically shows the construction of an image capturing and processing apparatus according to a first embodiment of the present invention.

FIG. 1 diagrammatically shows the construction of an image capturing and processing apparatus according to a first embodiment of the present invention. In FIG. 1, the reference numeral 1 designates image pickup means, the reference numeral 2 denotes reference three-dimensional shape model memorizing means, the reference numeral 3 designates first image memorizing means, the reference numeral 4 denotes second image memorizing means, the reference numeral 5 designates different portion extracting means, and the reference numeral 6 denotes shape model correcting means. These constituent portions will hereinafter be described in detail.

The image pickup means 1 is an image capturing camera provided with a zoom mechanism or the like. An object image captured by this image pickup means 1 is temporarily retained in the first image memorizing means 3.

The reference three-dimensional shape model memorizing means 2 memorizes therein in advance the reference three-dimensional shape model of a reference object which is an object, for example, a so-called wire frame model obtained by dividing the surface of the reference object by the mesh of a predetermined shape (such as a triangle), and maps gray level information or the like (texture) in each divided area onto the memorized wire frame model as it is seen from a predetermined direction to thereby produce a two-dimensional model reference object image (hereinafter referred to as the reference object image) when the reference object is seen from a predetermined direction. The reference object image produced by this reference three-dimensional shape model memorizing means 2 is memorized in the second image memorizing means 4.

The different portion extracting means 5 is means for extracting the different portion between the reference object image memorized in the second image memorizing means 4 and the object image memorized in the first image memorizing means 3. In this different portion extracting means 5, the reference object image and the object image are compared with each other and information reflecting a difference regarding three-dimensional shape information (the details of which will be described later) is extracted.

The shape model correcting means 6 is means for correcting the reference three-dimensional shape model memorized in the above-described reference three-dimensional shape model memorizing means 2, on the basis of the information reflecting the different portion extracted by the different portion extracting means 5. In this shape model correcting means 6, the reference three-dimensional shape model is corrected so that the reference object image may be approximate to an object image obtained by image capturing the object at the same viewing point position.

The specific processing by the above-described image capturing and processing apparatus will hereinafter be described.

In the reference three-dimensional shape model memorizing means 2, a typical object of which the three-dimensional shape is to be measured, for example, when the head of a particular person (a man) is an object, "the standard three-dimensional shape model of the head of man" is memorized, for example, as a wire frame model. Here, the reference three-dimensional shape model memorizing means 2 may apply mapping to "the standard three-dimensional shape model of the head head of man" memorized as the wire frame model as it is seen from a predetermined direction, to thereby produce an image as it is seen from a predetermined viewing point position under a predetermined illuminating condition or produce the image of only the wire frame as it is seen from a predetermined viewing point position. Alternatively, the viewing point position may not be preset, but although not shown, design may be made such that the output of the different portion extracting means 5 is fed back to the reference three-dimensional shape model memorizing means 2 to thereby find an optimum viewing point position and an image is produced from the found optimum viewing point position. The wire frame model to be memorized can be set in conformity with the object, and the information therefor is obtained, for example, from a memory provided internally or externally.

The reference three-dimensional shape model memorizing means 2 causes the image produced by one of the above-described methods as it is seen from a predetermined viewing point position to be memorized as the reference object image in the second image memorizing means 4, and the determination of the predetermined position may be designed to be inputted by a photographer or may be designed to be judged from the image pickup data by the image means 1. As this judging criterion, a characteristic point can be used, and a viewing point position at which the characteristic point is nearest may be adopted.

Figure 8:
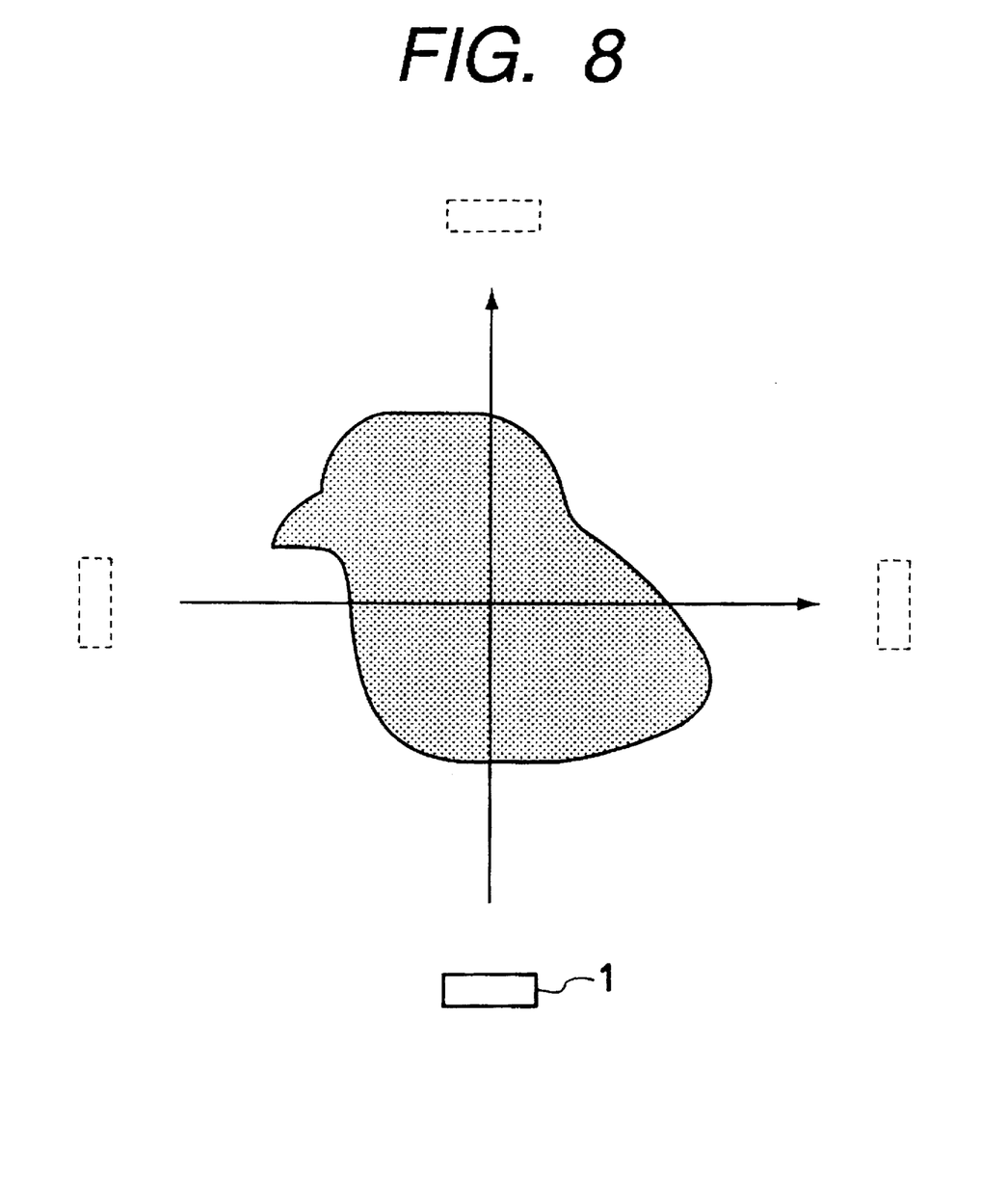
FIG. 8 is a model view showing the manner in which an object is image captured from different viewing point positions by image pickup means 1.

The image pickup means 1 image-captures an object of which the three-dimensional shape is to be measured from a predetermined viewing point position and causes the obtained object image to be memorized in the second image memorizing means 4. FIG. 8 is a model view showing the manner in which the object is image-captured from different viewing point positions by the image pickup means 1. In FIG. 8, the image capturing positions of the image pickup means 1 are indicated at four locations in XY plane for the sake of simplicity, but the actual image capturing position at one time is the location of the image pickup means 1 indicated, for example, by a solid line. The image capturing positions are shown only in XY plane for the sake of convenience, but if required, they are not restricted to ones in the XY plane, but may be viewing point positions in different planes or in the different visual axis direction.

In the present embodiment, the reference object image memorized in the second image memorizing means 4 and the object image memorized in the first image memorizing means 3 are adjusted so that their image sizes may substantially coincide with each other. For the adjustment of these image sizes, there are a case where the image size of the object image captured by the image pickup means 1 is adjusted to the reference object image memorized in the second image memorizing means 4 and a case where conversely, the image size of the reference object image produced by the reference three-dimensional shape model memorizing means 2 is adjusted to the object image memorized in the first image memorizing means 3.

In the case where the image size of the object image captured by the image pickup means 1 is adjusted to the reference object image, the image capturing position of the image pickup means relative to the object is adjusted so that the size of the image captured by the image pickup means 1 (the image memorized in the first image memorizing means 3) may become substantially equal to the size of the reference object image memorized in the second image memorizing means 4. This adjustment of the image capturing position of the image pickup means 1 to the object can also be effected by the use of the zooming function of the image pickup means 1.

On the other hand, in the case where the image size of the reference object image produced by the reference three-dimensional shape model memorizing means 2 is adjusted to the object image, when in the reference three-dimensional shape model memorizing means 2, for example, the reference object image standard at a predetermined viewing point position and under a predetermined illuminating condition is produced by the use of the technique of 3D computer graphics, the size of the produced reference object image is adjusted so as to become substantially equal to the size of the object image memorized in the first image memorizing means 3.

By the above-described adjustment of the image sizes of the reference object image and the object image, the coordinates system of the image captured by the image pickup means 1 (the object image memorized in the first image memorizing means 3) becomes the right-hand orthogonal coordinate system substantially coinciding with the reference coordinates system in the reference object image memorized in the second image memorizing means 4. It is to be understood that in this coordinates system, the Z-axis (not shown) is orthogonal to XY plane.

When in the manner described above, the object image and the reference object image which are substantially equal in the image size to each other are memorized in the first and second image memorizing means, respectively, the displacement of the different portion between these images, for example, the mutually corresponding points between these images, is found as a displacement vector in the following manner.

Figure 2:
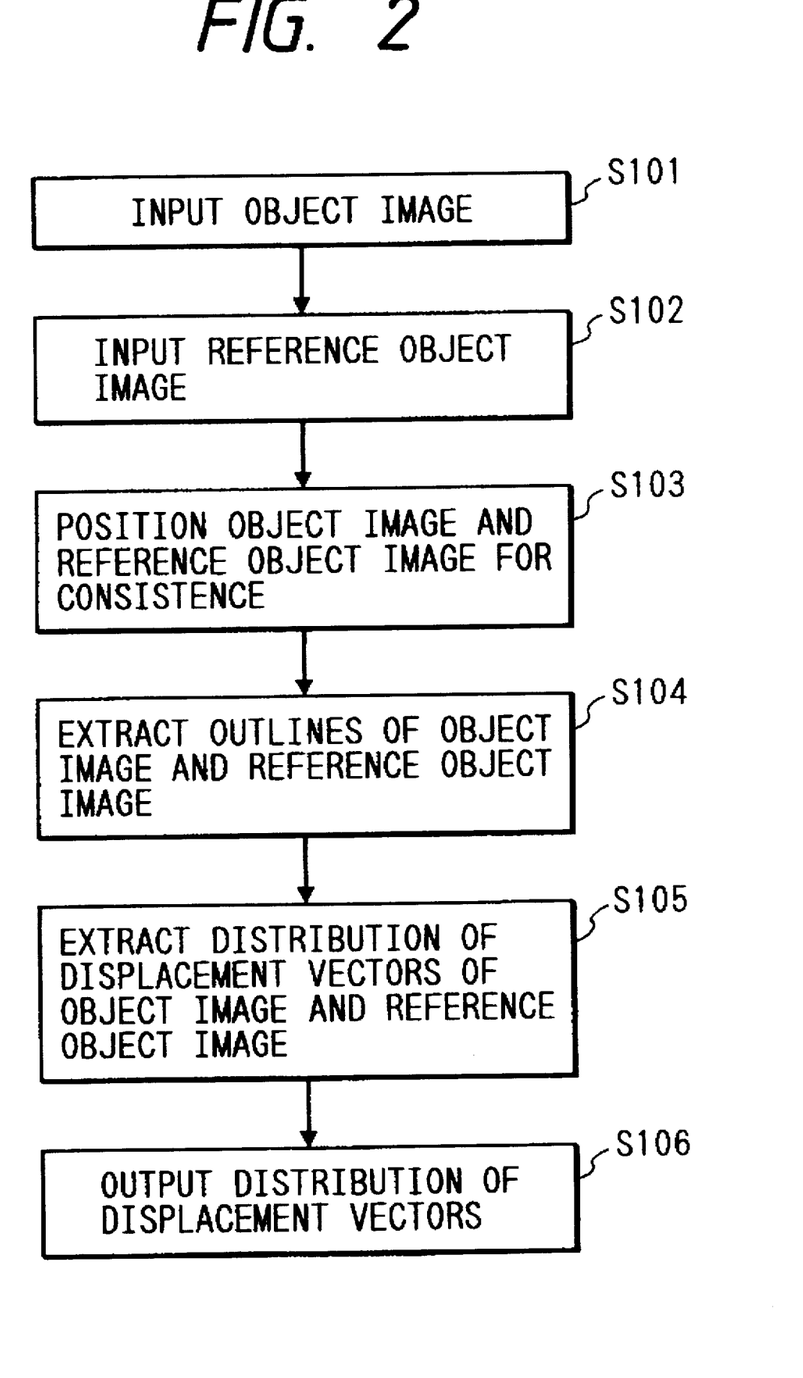
FIG. 2 is a flow chart showing the procedure of processing effected by different portion extracting means 5.

FIG. 2 is a flow chart showing the procedure effected by the different portion extracting means 5.

First, the object image (or the silhouette image thereof) and the reference object image (or the silhouette image thereof) which are substantially equal in the image size (are the same in the viewing point position or the visual axis direction) to each other are inputted from the first and second image memorizing means, respectively (S101 and S102).

The centroidal positions of the inputted images (or the silhouette images) are then found, and alignment between the images is effected so that the found centroidal positions may coincide with each other (S103). Thereafter, the contour extracting processes of the respective images (S104) are carried out, and assuming the difference between the obtained contour images as each point on the contours having been displaced from one image to the other image, the so-called displacement vectors indicating the displacement at each point is found (S105). The output from the different portion extracting means 5 is determined on the basis of the displacement vector at each point on the contour of the image of this reference three-dimensional shape model. When the displacement vectors are found, for example, each of the picture elements of the reference object image corresponding to each picture element of the object image or the three-dimensional positions (of which the coordinates axes may be arbitrarily set on the reference object) on the reference three-dimensional model (wire frame model) corresponding to each point on the contour of the object image, and the two-dimensional (in the image plane substantially orthogonal to the visual axis direction) displacement vectors at the respective picture elements are outputted (S106).

Without using the contour extracting process as described above being carried out, the detection of the displacement vectors may be effected at each point between the reference object image and the object image by the following image processing algorithm for motion vector detection. Typically, between two images divided into blocks of a predetermined size, the displacement vectors can be found by calculating the relative position vector about the block in one image which gives a maximum (or a minimum square error) cross correlation value to the block about a certain picture element in the other image.

Since, the reference object image and the object image are ones when the reference object and the object are supposed to be seen from the same direction (known) in the present embodiment, when the contour extraction is to be effected, the detection of the displacement vectors may be effected by using the technique of so-called active contour tracking method (refer to Japanese Laid-Open Patent Application No. 5-12443) or by searching in a direction substantially orthogonal to the contour tangent vector at each point on the contour of the reference object image, or the displacement vector may be chosen so that the size thereof may be minimum at each point.

When the displacement vectors (two-dimensional) found in the manner described above is outputted from the different portion extracting means 5, correcting vectors for correcting the reference three-dimensional model (wire frame model) memorized in the reference three-dimensional shape model memorizing means 2 from the two-dimensional displacement vector are found in the shape model correcting means 6, and the correction of the reference three-dimensional model is effected on the basis of the thus found correcting vectors. When the correcting vectors are found from these two-dimensional displacement vectors, there are a case where the correcting vectors are found from two-dimensional displacement vectors found from points on the contour of the reference object image and a case where the correcting vector is found from two-dimensional displacement vectors found from any points on the reference object image. An example of the correcting vector found in each of the above-described cases will be given below.

(1) The case where the correcting vector is found from two-dimensional displacement vectors found from points on the contour of the reference object image.

It is to be understood that the angle of rotation θ with the optical axis of the image pickup means or the axis of viewing direction as the rotation axis is equal to a corresponding angle of rotation $\theta_M$ when producing the reference object image with the axis of viewing direction defined as the rotation axis. When a point on the reference three-dimensional shape model corresponding to a point (i, j) on the reference object image is $(X_{ij}, Y_{ij}, Z_{ij})$ and the displacement vector is $$\vec{d}_{ij}$$

the correcting vector $$\vec{dr}_{ij}$$

can be expressed as $$\vec{dr}_{ij} = C|\vec{d}_{ij}|\vec{n}_{ij} \quad (1)$$

and can be found on the basis of this expression. Here, $$\vec{n}_{ij}$$

is the normal vector on the point $(X_{ij}, Y_{ij}, X_{ij})$ and C is a constant, which determines a condition for effecting the normalization (making the image sizes coincident with each other) of the reference object image and the object image memorized in the first and second memorizing means, respectively. This constant C can be suitably set by a user in conformity with the size of the reference object image memorized in the first memorizing means, or the focal length, the object distance or the like regarding the reference object image.

(2) The case where the correcting vector is found from two-dimensional displacement vectors found from any points on the reference object image As in the case (1) described above, a point on the reference three-dimensional shape model corresponding to a point (i, j) on the reference object image is $(X_{ij}, Y_{ij}, Z_{ij})$ and the displacement vector is $$\vec{d}_{ij}$$

Then, the correcting vector $$\vec{dr}_{ij}$$

can be expressed as $$\vec{dr}_{ij} = C R \begin{pmatrix} (\vec{d}_{ij})x \\ (\vec{d}_{ij})y \\ 0 \end{pmatrix} \quad (2)$$

and can be found on the basis of this expression. Here, C', as in the case (1) described above, determines a condition for effecting the normalization of the reference object image and the object image, and is a proportional constant determined by the focal length of the image pickup means, the object distance or the like. Also, R is a three-dimensional rotation matrix given by $$R = \begin{pmatrix} \cos\beta\cos\gamma + \sin\alpha\sin\beta\sin\gamma & \cos\alpha\sin\gamma & -\sin\beta\cos\gamma \\ +\sin\alpha\cos\beta\sin\gamma & & \\ -\cos\beta\sin\gamma + \sin\alpha\sin\beta\cos\gamma & \cos\alpha\cos\gamma & \sin\beta\sin\gamma \\ +\sin\alpha\cos\beta\cos\gamma & & \\ \cos\alpha\sin\beta & -\sin\alpha & \cos\alpha\cos\beta \end{pmatrix}$$

and α, β and γ indicate the angles of rotation with respect to the coordinates axes of the world coordinates system of the camera coordinates system, designated as $X_w$, $Y_w$ and $Z_w$ axes.

As a method of measuring the parameter of each angle of rotation mentioned above, there is a method of measuring with a gyro carried on the image pickup means, a measuring method by a magnetic sensor, a method of measuring with the image pickup means carried on a measuring mechanism with mechanical joints, or the like. Without using such special measuring means, the evaluation of the degree of similarity of a reference object image and an object image obtained with varying visual axis directions to the reference object three-dimensional model may be effected to thereby estimate the parameters α, β and γ from the visual axis direction in which the degree of similarity is highest. In such case, however, it is necessary that the reference object model be sufficiently similar to the object shape.

The correction of the reference three-dimensional shape model memorized in the reference three-dimensional shape model memorizing means 2 is effected on the basis of the correcting vector found in the manner described above.

<Second Embodiment>

In the image capturing and processing apparatus according to the above-described first embodiment, the displacement vector is found from the reference object image and the object image from substantially the same viewing point which are inputted from the first and second memorizing means, respectively, whereby the three-dimensional shape data are obtained. An image capturing and processing apparatus according to this embodiment is characterized in that a plurality of reference object images and object images from different viewing points are memorized in the first and second memorizing means, respectively (but the mutually corresponding images are images from substantially the same viewing point) and three-dimensional shape data are obtained from a plurality of displacement vectors from different viewing points which are obtained between pairs of memorized reference object image and corresponding object image. The image capturing and processing apparatus according to the present embodiment is similar in construction to the image capturing and processing apparatus according to the aforedescribed first embodiment and therefore, the construction thereof need not be described.

Figure 3:
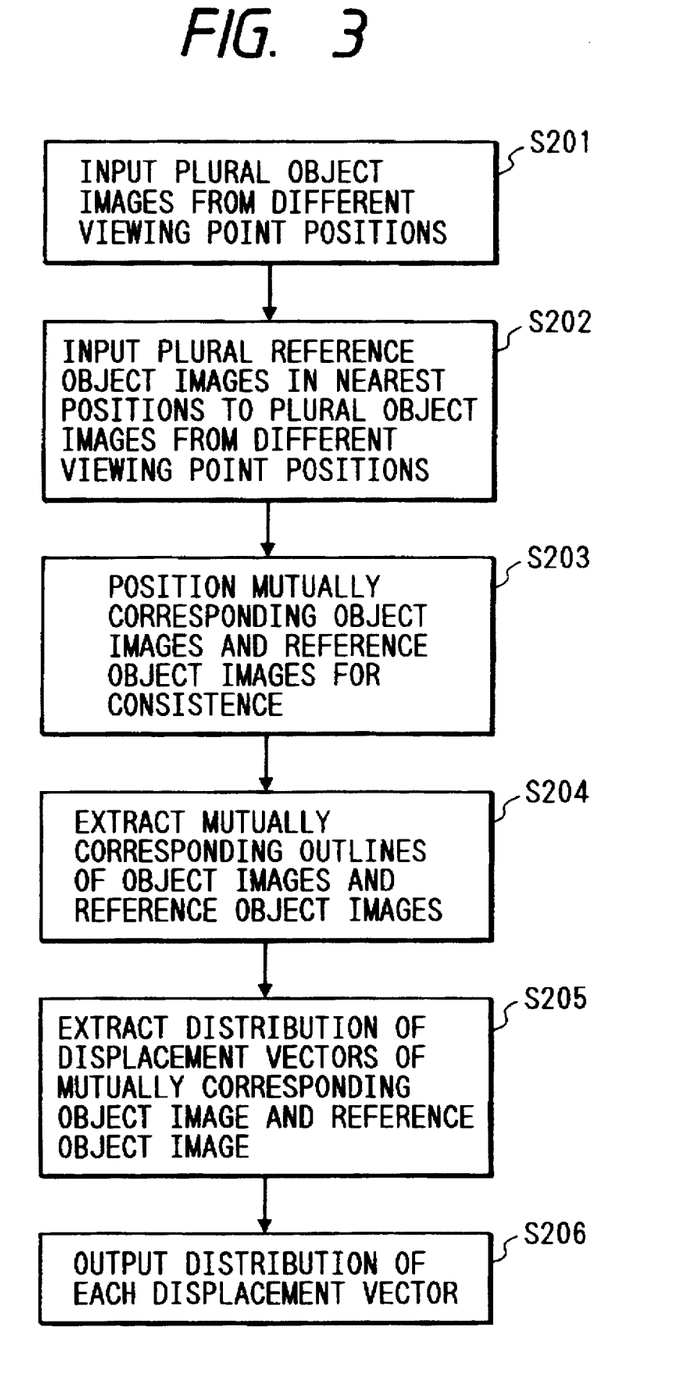
FIG. 3 is a flow chart showing the processing by different portion extracting means in an image capturing and processing apparatus according to a second embodiment of the present invention.

FIG. 3 is a flow chart showing the processing in the different portion extracting means in the image capturing and processing apparatus according to the second embodiment of the present invention.

A plurality of object images from different viewing point positions are first inputted from the first image memorizing means 3 (S201), and reference object images most approximate to those inputted object images are inputted from the second image memorizing means 4 (S202). Subsequently, alignment for consistence is effected between paris of inputted mutually corresponding object images and reference object images (S203). Thereafter, the contour extracting process of the respective images (S204) is carried out, and assuming that the difference between the obtained contour images results from each point on the contour having been displaced from one image to the other image, displacement vectors are found (S205). When the displacement vectors are found, the picture elements of the reference object image corresponding to the picture elements of the object image, or their three-dimensional position coordinates (of which the coordinates axes may be arbitrarily set on the reference object) on a reference three-dimensional model (wire frame model) corresponding to each point on the contour of the object image and a two-dimensional (in an image plane substantially orthogonal to the visual axis direction) displacement vector at each picture element are outputted (S206).

When a plurality of displacement vector data found in the manner described above are outputted from the different portion extracting means 5, the plurality of displacement vector data are integrated in the shape model correcting means 6 and correcting vectors are found, and on the basis of this, the correction of the reference three-dimensional model memorized in the reference three-dimensional shape model memorizing means 2 is effected. A specific method for calculating the correcting vectors in the shape model correcting means 6 will hereinafter be described.

When the viewing point positions (visual axis directions) in the images (the reference object image and the object image) from different viewing points are designated as I($\alpha_1$, $\beta_1$, $\gamma_2$) and II($\alpha_2$, $\beta_2$, $\gamma_2$) (($\alpha_1$, $\beta_1$, $\gamma_1$)≠($\alpha_2$, $\beta_2$, $\gamma_2$)) and the correcting vectors of the same points (X, Y, Z) obtained for respective ones thereof are $$\vec{d}^{(I)}(X,Y,Z), \quad \vec{d}^{(II)}(X,Y,Z)$$

Then, the correcting vector to be found $$\vec{dr}(X, Y, Z)$$

is given by $$\vec{dr}(X,Y,Z) = P\{\alpha \vec{d}^{(I)}(X,Y,Z) + (1-\alpha)\vec{d}^{(II)}(X,Y,Z)\} \quad (3)$$

It is to be understood here that P is a constant and $\alpha$ is given by $0<\alpha<1$. As the way of choosing $\alpha$, it is to be understood that $\alpha$ is determined by using, for example, S/N, luminance, dispersion of hue or the like and reference deflection value of the mutually corresponding images (the reference object image and the object image in the visual axis directions I and II at each point and the difference (or smoothness) from the correcting vector at an adjacent point, and an evaluation function representative of reliability. When for example, the distance from the contour is $S_{ij}$, $\alpha$ may be set so that reliability may increase as the distance from the contour becomes shorter, as is shown by $$\alpha = \exp\left(-\frac{S_{ij}}{\sigma^2}\right) \quad (4)$$

As described above, in the present embodiment, the correcting vector is found from a plurality of displacement vector data extracted from the images from different viewing points and therefore, the three-dimensional shape data of the object which are higher in reliability (accurate information of the local structure, etc.) and higher in resolution can be obtained.

<Third Embodiment>

Figure 4:
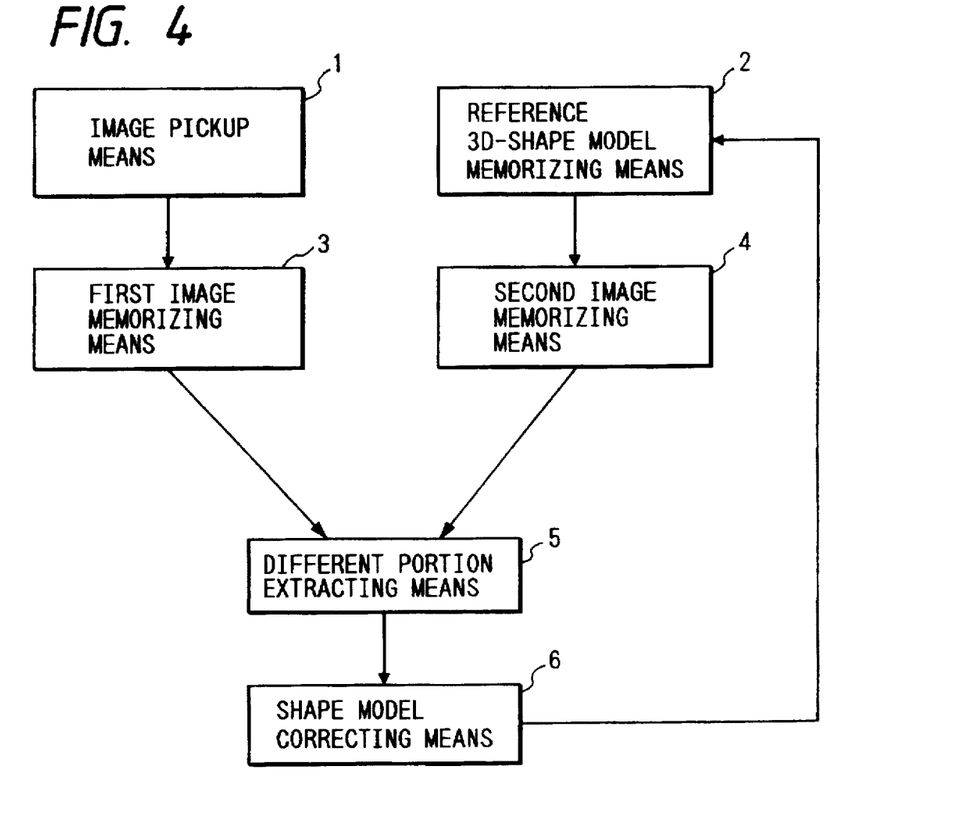
FIG. 4 diagrammatically shows the construction of an image capturing processing apparatus according to a third embodiment of the present invention.

FIG. 4 diagrammatically shows the construction of an image capturing and processing apparatus according to a third embodiment of the present invention. The image capturing and processing apparatus according to this embodiment is similar in construction to the apparatus according to the above-described first embodiment with the exception that the three-dimensional shape data found by the shape model correcting means 6 are fed back (transferred) to the reference three-dimensional shape model memorizing means 2. The processing in each constituent means is similar to that in the above-described first embodiment (or the second embodiment) and therefore need not be described herein.

In the image capturing and processing apparatus according to the present embodiment, the three-dimensional shape data (correcting vector) found on the basis of the displacement vector data outputted from the different portion extracting means 5 are fed back to the three-dimensional shape model memorizing means 2 by the shape model correcting means 6.

When the three-dimensional shape data are fed back to the three-dimensional shape model memorizing means 2, the three-dimensional shape model is corrected based on the fed-back three-dimensional shape data in the three-dimensional shape model memorizing means 2, and a reference object image is produced from the corrected frame model. This produced reference object image is memorized in the second image memorizing means 4. Thereafter, the process of finding three-dimensional shape data from the reference object image newly memorized in the second image memorizing means 4 and the object image is carried out.

The above process of feeding back the three-dimensional shape data is repetitively carried out, whereby the correction of errors and higher resolving power of the shape data which cannot be completely attained by the correction without feeding back process become possible.

<Fourth Embodiment>

An image capturing and processing apparatus according to this embodiment is similar is construction to the image capturing and processing apparatus according to the above-described first, second or third embodiment, and is characterized by the correction of the reference three-dimensional shape model in the shape model correcting means effected in the following manner.

First, in the shape model correcting means 6, a correcting vector based on an image obtained in a visual axis direction corresponding to the rotation angle parameters ($\alpha$, $\beta$, $\gamma$) of the image pickup means is given by an affine transformation coefficient $a_{ij}$ (X, Y, Z) defined by $$\vec{dr}(X,Y,Z) = \begin{pmatrix} a_{11} & a_{12} & a_{13} \\ a_{21} & a_{22} & a_{23} \\ a_{31} & a_{32} & a_{33} \end{pmatrix} \begin{pmatrix} X \\ Y \\ Z \end{pmatrix} \quad (5)$$

The correction of the reference three-dimensional shape model is effected on the basis of this correcting vector. The correction of this reference three-dimensional shape model is effected by finding the affine transformation coefficient $a_{ij}$ (X, Y, Z) so that the difference between the reference object image and the object image in the same visual axis direction obtained on the basis of the corrected reference three-dimensional shape model may become minimum. Thus, the correction of the reference three-dimensional shape model can be simply effected.

<Fifth Embodiment>

Figure 5:
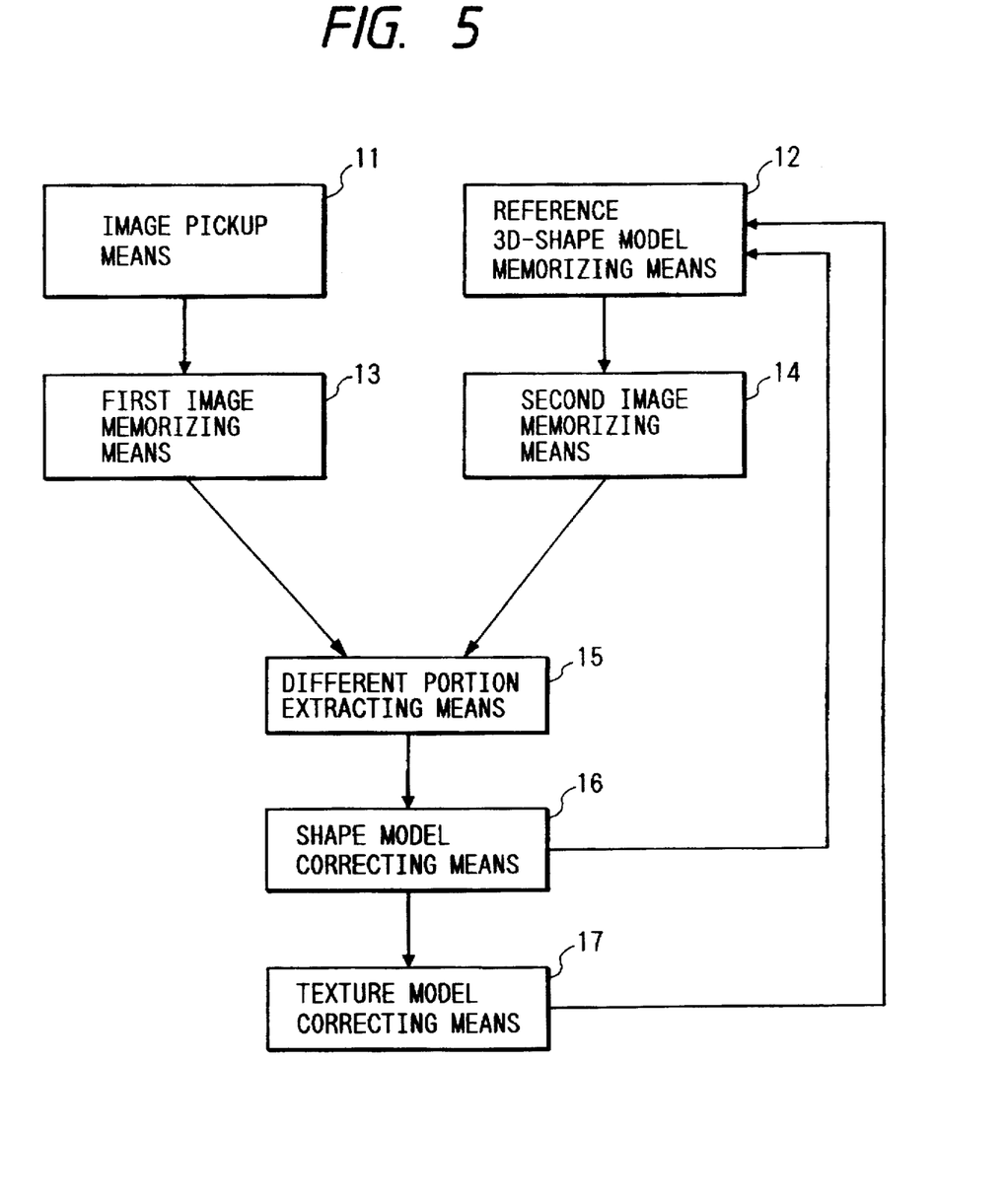
FIG. 5 diagrammatically shows the construction of an image capturing and processing apparatus according to a fourth embodiment of the present invention.

FIG. 5 diagrammatically shows the construction of an image capturing and processing apparatus according to a fifth embodiment of the present invention.

In FIG. 5, the reference numeral 11 designates image pickup means, the reference numeral 12 denotes reference three-dimensional shape model memorizing means, the reference numeral 13 designates first image memorizing means, the reference numeral 14 denotes second image memorizing means, the reference numeral 15 designates different portion extracting means, the reference numeral 16 denotes shape model correcting means, and the reference numeral 17 designates texture model correcting means. The processing in each of these constituent means will hereinafter be described.

The image pickup means 11, the reference three-dimensional shape model memorizing means 12, the first image memorizing means 13 and the second image memorizing means have the same processing functions as those in the image capturing and processing apparatus according to the aforedescribed first embodiment.

The different portion extracting means 15 compares a reference object image and an object image inputted from the first and second image memorizing means 13 and 14, respectively, and extracts the difference in contour for correcting a reference three-dimensional shape model memorized in the reference three-dimensional shape model memorizing means 12, and displacement vectors for correcting the reference object image (texture model) memorized in the second image memorizing means 14. It is to be understood that the extraction of the displacement vectors for correcting the reference object image (texture model) is effected at each point on the texture in the contour.

The shape model correcting means 16 corrects the reference three-dimensional shape model memorized in the reference three-dimensional shape model memorizing means 12, on the basis of the difference in the contour found by the different portion extracting means 15. In the present embodiment, design is made such that the found correcting vector is fed back (transferred) from three-dimensional shape model memorizing means 12 and the correction of the reference three-dimensional shape model based on the correcting vector is repetitively effected.

The texture model correcting means 17 corrects the texture model on the basis of the displacement vector found by the different portion extracting means 15. That is, this texture model correcting means 17 corrects the reference object image (texture model) newly memorized in the second image memorizing means 14 by the reference three-dimensional model memorizing means 12 on the basis of the reference three-dimensional shape model corrected by the shape model correcting means 16. In the present embodiment, the correction of the texture model in this texture model correcting means 17 is effected so that the correcting vector extracted by the different portion extracting means 15 (i.e., the displacement vector extracted from the reference object image (texture model) obtained after the correction of the reference three-dimensional shape model by the shape model correcting means 16, and the object image captured by the image pickup means 11 and memorized in the first image memorizing means 13) may become minimum.

Figure 6:
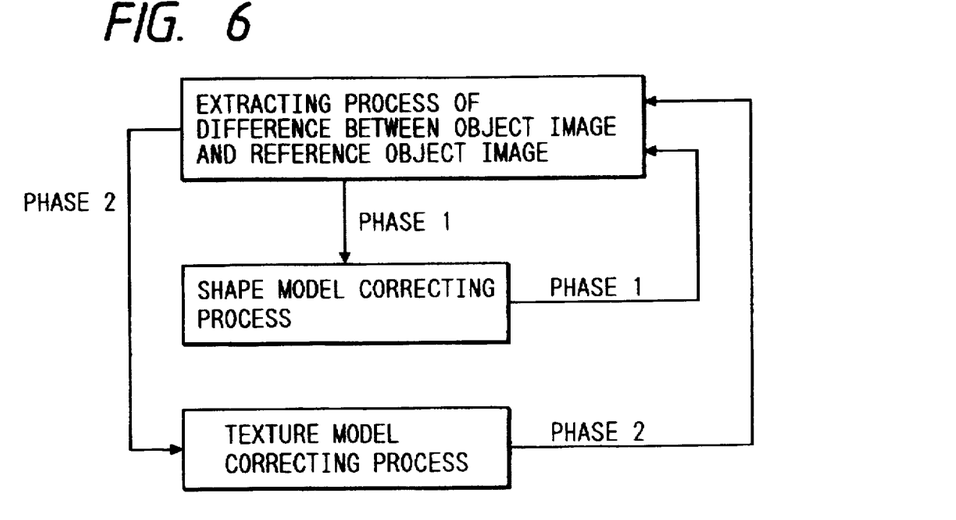
FIG. 6 is a flow chart showing a correcting process effected in the image capturing and processing apparatus shown in FIG. 5, in a simplified manner.

FIG. 6 is a flow chart showing in a simplified manner the correcting process carried out in the image capturing and processing apparatus according to the present embodiment, i.e., the process of correction of the above-described reference three-dimensional shape model and texture model. In Phase 1, the difference extracting process and the shape model correcting process are carried out, and in Phase 2, the difference extracting process and the texture model correcting process are carried out.

The image capturing and processing apparatus according to the present embodiment, as shown in FIG. 6, is designed such that in addition to the correction of the reference three-dimensional shape model, the correction of the texture model is also effected, and is capable of correcting the shape and the pattern.

<Sixth Embodiment>

An image capturing and processing apparatus according to this embodiment is characterized in that the extraction of a contour regarding the object image retained in the first image memorizing means is effected by the use of the contour data of the reference object image seen from a predetermined viewing point position (the same position as the viewing point position of the object image) extracted from the reference three-dimensional shape model memorized in the three-dimensional shape model memorizing means with the technique of an active contour method which will be described later applied thereto.

Figure 7:
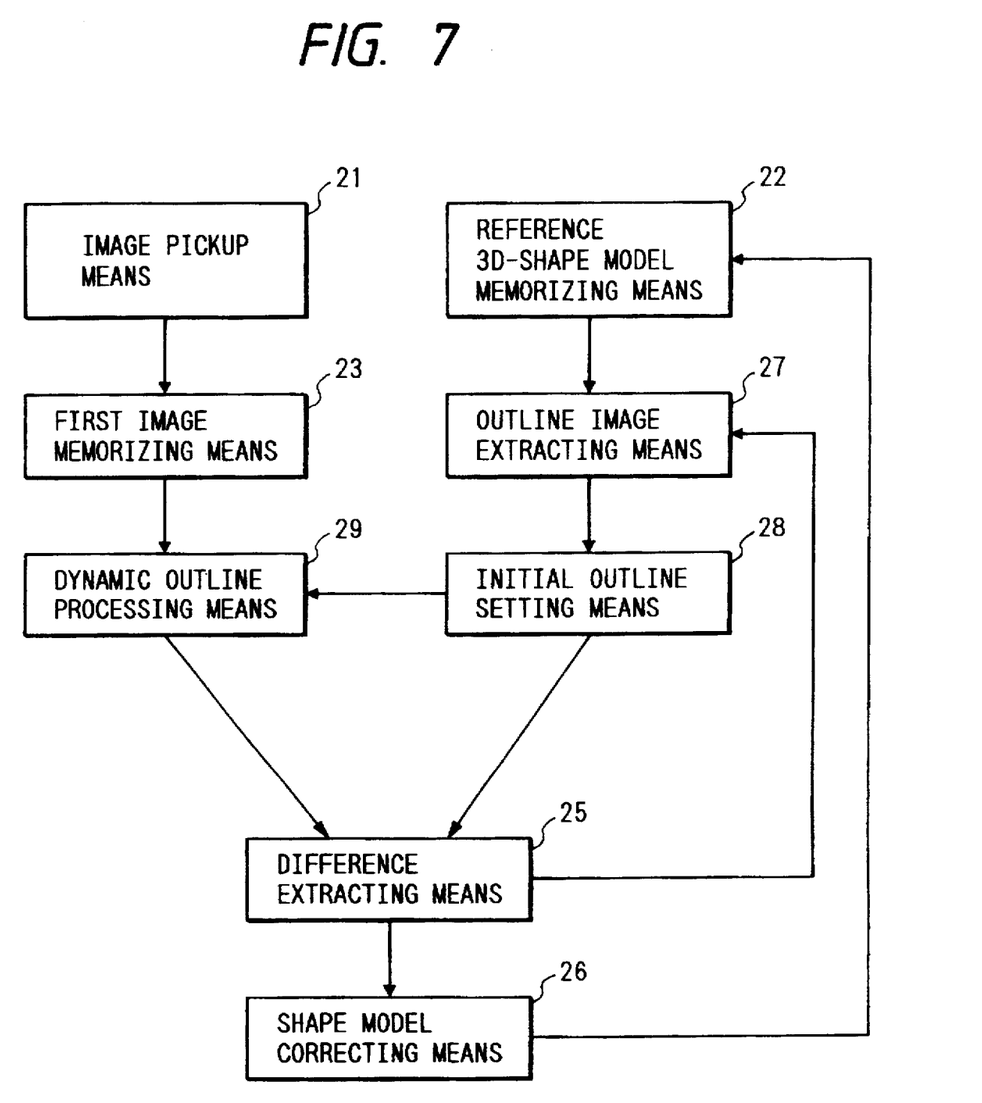
FIG. 7 diagrammatically shows the construction of an image capturing and processing apparatus according to a fifth embodiment of the present invention.

FIG. 7 diagrammatically shows the construction of an image capturing and processing apparatus according to a sixth embodiment of the present invention. In FIG. 7, the reference numeral 21 designates image pickup means, the reference numeral 22 denotes three-dimensional shape model memorizing means, the reference numeral 23 designates first image memorizing means, the reference numeral 25 denotes difference extracting means, the reference numeral 26 designates shape model correcting means, the reference numeral 27 denotes contour image extracting means, the reference numeral 28 designates initial contour setting means, and the reference numeral 29 denotes active contour processing means. Each of these constituent means will hereinafter be described in detail.

The image pickup means 21 and the first image memorizing means 23 are similar to those in the image capturing and processing apparatus according to each of the aforedescribed embodiments, and the object image captured by the image pickup means 21 is retained in the first image memorizing means 23.

The reference three-dimensional shape model memorizing means 22, like that in the image capturing and processing apparatus according to each of the aforedescribed embodiments, memorizes the reference three-dimensional shape model, but in the present embodiment, the process of extracting the contour image of the reference object image by the reference three-dimensional shape model memorizing means 22 which will be described later is carried out instead of the memorization of the reference object image into the second image memorizing means.

The reference three-dimensional shape model memorizing means 22 and the image pickup means 21 are similar to those in the image capturing and processing apparatus according to each of the aforedescribed embodiments, and the reference three-dimensional shape model is memorized in the reference three-dimensional shape model memorizing means 22, and the object image captured by the image pickup means 21 is retained in the first image memorizing means 23.

The contour image extracting means 27 is means for extracting the contour image regarding the reference object image when the reference three-dimensional shape model memorized in the reference three-dimensional shape model memorizing means 22 is seen from a predetermined viewing point position.

The initial contour setting means 28 sets, relative to the contour image of the reference object image extracted by the contour image extracting means 27, the position and size of that contour image so as to subsume the image area of the object image retained in the first image memorizing means 23 (the setting of the initial contour).

The active contour processing means 29 deforms and moves the contour of the contour image of which the initial contour has been set by the initial contour setting means 28 (hereinafter referred to as the initial contour) by an active contour method which will be described later, and converges it on the object image retained in the first image memorizing means. Thereby, the contour image regarding the object image retained in the first image memorizing means can be obtained accurately and quickly.

Here, the active contour method refers to a technique for finding, relative to a contour $$v(s)=(x(s), y(s))$$

expressed by the use of a parameter s representative of the position (coordinates) of each point on a contour, the contour v(s) in which an evaluation function $$E = \int_0^u E_1(v(s)) + \omega_0 E_0(v(s)) ds \quad (6)$$

becomes minimum. Here, $E_1$ and $E_0$ are $$E_1(v(s)) = \alpha(s)\left|\frac{dv}{ds}\right|^2 + \beta(s)\left|\frac{d^2v}{ds^2}\right|^2 \quad (7)$$

$$E_0(v(s)) = -|\nabla I(v(s))|^2$$

and $\alpha(s)$, $\beta(s)$ and $W_0$ are suitably set by the user. This active contour method is a method of finding such an initial contour that surrounds an object (in the present embodiment, the object image captured by the present embodiment, the object image captured by the image pickup means 21), deforming and moving the found initial contour so that a predetermined evaluation function may become minimum, and finally converging it on the object (M. Kass et al., "Snakes: Active Contour Models", *International Journal of Computer Vision*, Vol. 1, pp. 321–331, 1987). In the present embodiment, a certain evaluation function defined with respect to the initial contour of the reference object (not restricted to the above-mentioned evaluation function) is minimized, whereby the contour image of the object image is found.

The difference extracting means 25 extracts the difference between the contour image (of which the setting of the initial contour has been effected) of the reference image found by the initial contour setting means 28 and the contour image of the object image found by the active contour processing means 29 as a displacement vector as in the case of each of the aforedescribed embodiments. However, it is desirable to normalize the size of each displacement vector at a predetermined rate or set the size of the initial contour image so as to be most approximate to the size of the contour image of the object image before finding the displacement vector. The displacement vector extracted by this difference extracting means 25 is outputted to the shape model correcting means 26 which contour image extracting means 27. In the present embodiment, by this feedback to the contour image extracting means 27, the viewing point position when the contour image extracting means 27 extracts the contour image of the reference object image becomes a viewing point position which finally gives a contour model most approximate to the contour of the object image.

The shape model correcting means 26, as in the case of each of the aforedescribed embodiments, is means for finding a correcting vector for correcting the reference three-dimensional shape model memorized in the shape model correcting means 26 from the displacement vector extracted by the difference extracting means 25. The correcting vector found by this shape model correcting means 26 is fed back to the three-dimensional shape model memorizing means 22. By this feedback, the correction of errors and higher resolving power of shape data which cannot be completely attained by one correction process become possible as in the case of the aforedescribed third and fifth embodiments.

Description will now be made of the operation of the image capturing and processing apparatus constructed as described above.

In the same manner as in each of the aforedescribed embodiments, the object image captured by the image pickup means 21 is memorized in the first image memorizing means 23.

Subsequently, by the contour image extracting means 27, the contour image regarding the reference object image is extracted from the reference three-dimensional shape model memorized in the three-dimensional shape model memorizing means 22, and by the initial contour setting means 28, the setting of the initial contour is effected relative to the extracted contour image. This contour image of which the initial contour has been set is outputted to the active contour processing means 29 and the difference extracting means 25.

When the setting of the initial contour is effected by the initial contour setting means 28, the active contour processing means 29 deforms and moves the initial contour of the contour image of which the initial contour has been set by the initial contour setting means 28, by the use of the active contour method, and extracts the contour image regarding the object image memorized in the first image memorizing means 23. This extracted contour image regarding the object image is outputted to the difference extracting means 25.

When the contour image regarding the reference object image and the contour image regarding the object image are inputted from the initial contour setting image are inputted from the initial contour setting means 28 and the active contour processing means 29, respectively, the difference between these images is extracted as a displacement vector in the difference extracting means 25, and this extracted displacement vector is fed back to the contour image extracting means 27. This process of feeding back is repetitively carried out, whereby the viewing point position of the contour image extracted by the contour image extracting means 27 becomes a viewing point position which finally gives a contour model most approximate to the contour of the object image.

When the viewing point position of the contour image extracted by the contour image extracting image 27 becomes the viewing point position which finally gives a contour model most approximate to the contour of the object image, a final displacement vector is outputted from the difference extracting means 25 to the shape model correcting means 26.

When the final displacement vector is outputted from the difference extracting means 25 to the shape model correcting means 26, a correcting vector is found from the displacement vector in the shape model correcting means 26, and the found correcting vector is fed back to the three-dimensional shape model memorizing means 22. Thereby, the reference three-dimensional shape model memorized in the three-corrected. This process of feeding back is repetitively carried out, whereby the correction of errors and higher resolving power of shape data which cannot be completely covered by one correction process become possible.

What is claimed is:

1. An image capturing and processing apparatus comprising:

image pickup means;

first image memorizing means in which an object image from a predetermined viewing point position captured by said image pickup means is memorized;

three-dimensional shape model memorizing means for memorizing a reference three-dimensional shape model regarding the object image captured by said image pickup means, and producing a reference object image from a viewing point position nearest to the object image captured by said image pickup means, on the basis of said reference three-dimensional shape model;

second image memorizing means in which the reference object image produced by said three-dimensional shape model memorizing means is memorized;

different portion extracting means for extracting the different portion between the object image memorized in said first image memorizing means and the reference object image memorized in said second image memorizing means; and shape model correcting means for correcting the reference three-dimensional shape model memorized in said three-dimensional shape model memorizing means, on the basis of the different portion extracted by said different portion extracting means.

2. An image capturing and processing apparatus according to claim 1, wherein a plurality of object images from different viewing point positions are memorized in said first image memorizing means, a plurality of reference object images corresponding to the plurality of object images from said different viewing point positions are memorized in said second image memorizing means, said different portion extracting means extracts the different portions between the mutually corresponding ones of the object images memorized in said first image memorizing means and the reference object images memorized in said second image memorizing means, and said shape model correcting means corrects the reference three-dimensional shape model memorized in said three-dimensional shape model memorizing means, on the basis of the respective different portions extracted by said different portion extracting means.

3. An image capturing and processing apparatus according to claim 2, wherein the reference three-dimensional shape model memorized in said three-dimensional shape model memorizing means is a mesh-like wire frame model divided into predetermined shapes, and said different portion extracting means extracts the different portion between the object image and the reference object image on the basis of the central coordinates of the respective elements of said wire frame model divided into mesh-like shapes and the normal vector at said central coordinates.

4. An image capturing and processing apparatus according to claim 2, wherein after the correction of the reference three-dimensional shape model by said shape model correcting means is effected, said three-dimensional shape model memorizing means produces the reference object image on the basis of said corrected reference three-dimensional shape model, and said shape model correcting means repetitively effects the correction of the reference three-dimensional shape model until the different portion between the reference object image based on the reference three-dimensional shape model after correction and the object image extracted by said different portion extracting means becomes a predetermined threshold value or less.

5. An image capturing and processing apparatus according to claim 4, wherein said different portion extracting means is one which extracts the difference regarding structural information for correcting the reference three-dimensional shape model and the difference regarding texture information for correcting the reference object image produced by said three-dimensional shape model memorizing means, and has texture correcting means for correcting the reference object image after the correction of the reference three-dimensional shape model produced by said three-dimensional shape model memorizing means, on the basis of the difference regarding the texture information extracted by said different portion extracting means.

6. An image capturing and processing apparatus according to claim 1, wherein the correction of the reference three-dimensional shape model effected in said shape model correcting means is effected by the use of an affine transformation coefficient, and said shape model correcting means effects the correction of the reference three-dimensional shape model by the use of such an affine transformation coefficient that the different portion extracted by said different portion extracting means becomes minimum.

7. An image capturing and processing apparatus according to claim 1, wherein the reference three-dimensional shape model memorized in said three-dimensional shape model memorizing means is a mesh-like wire frame model divided into predetermined shapes, and said different portion extracting means extracts the different portion between the object image and the reference object image on the basis of the central coordinates of the respective elements of said wire frame model divided into mesh-like shapes and the normal vector at said central coordinates.

8. An image capturing and processing apparatus according to claim 1, wherein after the correction of the reference three-dimensional shape model by said shape model correcting means is effected, said three-dimensional shape model memorizing means produces the reference object image on the basis of said corrected reference three-dimensional shape model, and said shape model correcting means repetitively effects the correction of the reference three-dimensional shape model until the different portion between the reference object image based on the reference three-dimensional shape model after correction and the object image extracted by said different portion extracting means becomes a predetermined threshold value or less.

9. An image capturing and processing apparatus according to claim 8, wherein said different portion extracting means is one which extracts the difference regarding structural information for correcting the reference three-dimensional shape model and the difference regarding texture information for correcting the reference object image produced by said three-dimensional shape model memorizing means, and has texture correcting means for correcting the reference object image after the correction of the reference three-dimensional shape model produced by said three-dimensional shape model memorizing means, on the basis of the difference regarding the texture information extracted by said different portion extracting means.

10. An image capturing and processing apparatus comprising:

image pickup means;

image memorizing means in which an object image from a predetermined viewing point position captured by said image pickup means is memorized;

three-dimensional shape model memorizing means in which a reference three-dimensional shape model regarding the object image captured by said image pickup means is memorized;

contour image extracting means for extracting a contour image regarding a reference object image from a viewing point position nearest to the object image captured by said image pickup means, on the basis of the reference three-dimensional shape model memorized in said three-dimensional shape model memorizing means;

initial contour setting means for setting an initial contour so that the position and size of the contour image regarding the reference object image extracted by said contour image extracting means may subsume the image area of the object image memorized in said image memorizing means;

active contour processing means for producing an contour image regarding the object image memorized in said image memorizing means, on the basis of the contour of the contour image of which the initial contour has been set by said initial contour setting means;

difference extracting means for extracting the difference between the contour image regarding the object image produced by said active contour processing means and the contour image regarding the reference object image of which the initial contour has been set by said initial contour setting means; and shape model correcting means for correcting the reference three-dimensional shape model memorized in said three-dimensional shape model memorizing means, on the basis of the difference extracted by said difference extracting means.

11. An image capturing and processing apparatus according to claim 10, wherein said contour image extracting means extracts the contour image regarding such a reference object image that the difference extracted by said difference extracting means becomes minimum.

12. An image capturing and processing method of restituting a three-dimensional shape model regarding an object on the basis of an object image captured by image pickup means comprising:

the first step of memorizing a reference three-dimensional shape model regarding the object image-captured;

the second step of producing a reference object image corresponding to the object image captured by said image pickup means, on the basis of the reference three-dimensional shape model memorized at said first step;

the third step of extracting the difference between the reference object image produced at said second step and the object image captured by said image pickup means; and the fourth step of correcting the reference three-dimensional shape model regarding the object memorized at said first step, on the basis of the difference extracted at said third step, and restituting the shape model of the object.

13. An image capturing and processing method according to claim 12, wherein at said third step, the differences between mutually corresponding ones of a plurality of object images from different viewing point positions captured by said image pickup means and a plurality of reference object images from different viewing point positions corresponding to said plurality of object images are extracted, and at said fourth step, the reference three-dimensional shape model regarding the object is corrected on the basis of the difference extracted at said third step.

14. An image capturing and processing method of restituting a reference three-dimensional shape model regarding an object on the basis of an object image captured by image pickup means comprising:

the first step of memorizing a reference three-dimensional shape model regarding the object image captured;

the second step of extracting the contour image of a reference object image corresponding to the object image captured by said image pickup means, on the basis of the reference three-dimensional shape model memorized at said first step;

the third step of setting an initial contour so that the position and size of the contour image regarding the reference object image extracted at said second step may subsume the image area of the object image captured by said image pickup means;

the fourth step of producing a contour image regarding the object image captured by said image pickup means, on the basis of the contour image regarding the reference object image of which the initial contour has been set at said third step;

the fifth step of extracting the difference between the contour image regarding the object image produced at said fourth step and the contour image regarding the reference object image of which the initial contour has been set at said third step; and the sixth step of correcting the reference three-dimensional shape model regarding the object memorized at said first step, on the basis of the difference extracted at said first step, and restituting the shape model of the object.

* * * * *